United States Patent

Fujimoto et al.

[11] Patent Number: 5,897,743
[45] Date of Patent: Apr. 27, 1999

[54] JIG FOR PEELING A BONDED WAFER

[75] Inventors: Kazuaki Fujimoto; Hiroshi Furukawa; Hirotaka Kato, all of Hiratsuka, Japan

[73] Assignee: Komatsu Electronic Metals Co., Ltd., Hiratsuka, Japan

[21] Appl. No.: 08/786,767

[22] Filed: Jan. 21, 1997

[30] Foreign Application Priority Data

Jan. 22, 1996 [JP] Japan .................................. 8-028577
Mar. 11, 1996 [JP] Japan .................................. 8-080509

[51] Int. Cl.$^6$ ..................................................... B32B 35/00
[52] U.S. Cl. ............................ 156/584; 156/344; 29/239; 29/426.5
[58] Field of Search .................................. 156/344, 584; 81/3.55, 3.47, 3.49, 3.7; 29/239, 426.5

[56] References Cited

U.S. PATENT DOCUMENTS

| | | | |
|---|---|---|---|
| 1,048,412 | 12/1912 | Hutchinson | 81/3.7 |
| 1,242,392 | 10/1917 | Underwood | 81/3.7 |
| 1,338,539 | 4/1920 | Volz | 81/3.7 |
| 1,412,743 | 4/1922 | Herfjord | 81/3.7 |
| 1,556,460 | 2/1925 | Thill | 81/3.7 |
| 1,915,269 | 6/1933 | Carver | 81/3.7 |
| 2,444,097 | 6/1948 | Grant | 29/239 X |
| 3,997,957 | 12/1976 | Tone et al. | 29/239 |
| 5,783,022 | 7/1998 | Cha et al. | 156/344 |

*Primary Examiner*—Mark A. Osele
*Attorney, Agent, or Firm*—Varndell Legal Group

[57] ABSTRACT

A peeling jig is provided for peeling a bonded wafer having voids formed in bonding surfaces so as to rebond, which does not injure the bonding surfaces or cause the adherence of particles thereto. The peeling jig includes a wedge portion 1$a$ for inserting into the bonding surfaces, and a flat portion provided at the both sides of the base of the wedge portion. The apex angle of the wedge portion, when the chamfered angles at the bonding sides of the supporting substrate and active wafer of the bonded wafer to be separated are respectively $\alpha$ and $\beta$, is $\theta$ and $\theta > \alpha + \beta$. When the wedge portion is inserted into the bonding surfaces, the right and left inclined surfaces of the wedge portion are in contact with the peripheries of the chamfered portions, and then chamfered portions are flared. Accordingly, the bonded wafer is separated by the wedge portion into the supporting substrate and the active wafer without being contacted with the bonding surfaces until the flat portions are in contact with the periphery of the bonded wafer.

6 Claims, 2 Drawing Sheets

JIG FOR PEELING A BONDED WAFER

BACKGROUND OF THE INVENTION

1. Field of the Invention

The present invention relates to a peeling jig for a bonded wafer, and more specifically to a peeling jig suitable for use in separating bonded wafer having voids which have occurred, prior to thermal process in the fabrication of bonded SOI wafers.

2. Description of the Prior Art

Referring to FIG. 3, in a conventional method for fabricating a bonded SOI wafer, a single-side mirror processed supporting substrate 3 and an active wafer 4, which has been single-side mirror processed and thermal oxidation processed to form an insulating layer 4b ($SiO_2$) of a predetermined thickness, are respectively hydrophilic processed by means of ammonia and hydrogen peroxide solution or the like, followed by bonding them together using bonding jigs. The bonded wafers are then thermally processed to finish the bonding process.

Even if there is only one void found in a bonded wafer, the bonded wafer is discarded as a defective item or the bonding surface thereof is peeled with a peeling jig and then rebonded.

However, once the bonded wafer is peeled off from its bonding surface into a supporting substrate(wafer) and an active wafer, scars are formed at the bonding surfaces thereof when the bonding surfaces are in contact with the peeling jig, or particles are adhered thereon, making the wafers unsuitable for reuse. Therefore, it is a disadvantage that the wafers which have scars or the wafers on which particles are adhered that can not be washed off must be discarded.

Not only bonded SOI wafer but direct bonded wafers which have not insulating layers sandwiched between the supporting substrate and the active wafer, have a similar disadvantage.

SUMMARY OF THE INVENTION

In view of the problems encountered in the conventional method, the object of the invention is to provide a jig for peeling a bonded wafer, which does not injure the bonding surfaces and no particles adhere to the bonding surfaces when peeling the bonded wafer in the case that voids are formed in the bonded boundary surface of the bonded wafer.

In order to attain the above-mentioned object, the jig of the present invention for peeling the bonded wafer is a jig for separating the bonded wafer having voids formed after the bonding process and prior to a bonding thermal process. The peeling jig includes a wedge portion to be inserted into the bonded boundary surface of the bonded wafer and flat portions provided at both sides of the base of the wedge portion for controlling the inserted depth of the wedge portion.

According to an aspect of the invention, the jig of the present invention for peeling bonded SOI wafers is a jig for separating bonded wafers having voids formed after the bonding process in which a single-side mirror processed supporting substrate and an active wafer, which has been single-side mirror processed and thermal oxidation processed to form an insulating film of a predetermined thickness, are bonded together using bonding jigs, and prior to a bonding thermal process. The peeling jig includes a wedge portion to be inserted into the bonded boundary surface of the bonded wafer and the flat portions provided at both sides of the base of the wedge portion for controlling the inserted depth of the wedge portion.

According to another aspect of the invention, when the chamfered angles at the bonding surface of the supporting substrate and active wafer are respectively $\alpha$ and $\beta$, the wedge portion of the peeling jig of the invention has an apex angle $\theta$ where $\theta > \alpha + \beta$.

The jig of the invention is a peeling jig suitable for use in temporarily separating a bonded wafer when voids are formed in the bonded boundary surface between a supporting substrate(wafer) and an active wafer so that the two wafers can be rebonded. At the periphery of the bonded boundary surface a V-shaped groove is formed by the chamfered portion of the wafers. By inserting the wedge portion of the peeling jig into the bonding surface from the groove, until the flat portion provided at the both sides of the base of the wedge portion is in contact with the periphery of the wafers, the bonding surface can be separated.

When the chamfered angles of the supporting substrate and the active wafer are respectively $\alpha$ and $\beta$, then the angle of the V-shaped groove is $\alpha + \beta$. Therefore, if the apex angle of the wedge portion is $\theta$ and $\theta > \alpha + \beta$, then the inclined portion of the wedge portion is in contact with the periphery of the chamfered portions of the supporting substrate and the active wafer, so as to flare the supporting substrate and the active wafer outwardly without contacting the bonding surface and peel the bonding surface. As a result, the mirror processed bonding surface is peeled without forming scars and no particles adhere to the separated wafer surfaces.

BRIEF DESCRIPTION OF THE DRAWINGS

The peeling jig for a bonded wafer such as a bonded SOI wafer of the present invention is hereinafter described with reference to the preferred embodiment and accompanying drawings in which.

DESCRIPTION OF THE PREFERRED EMBODIMENT

Figure 1:
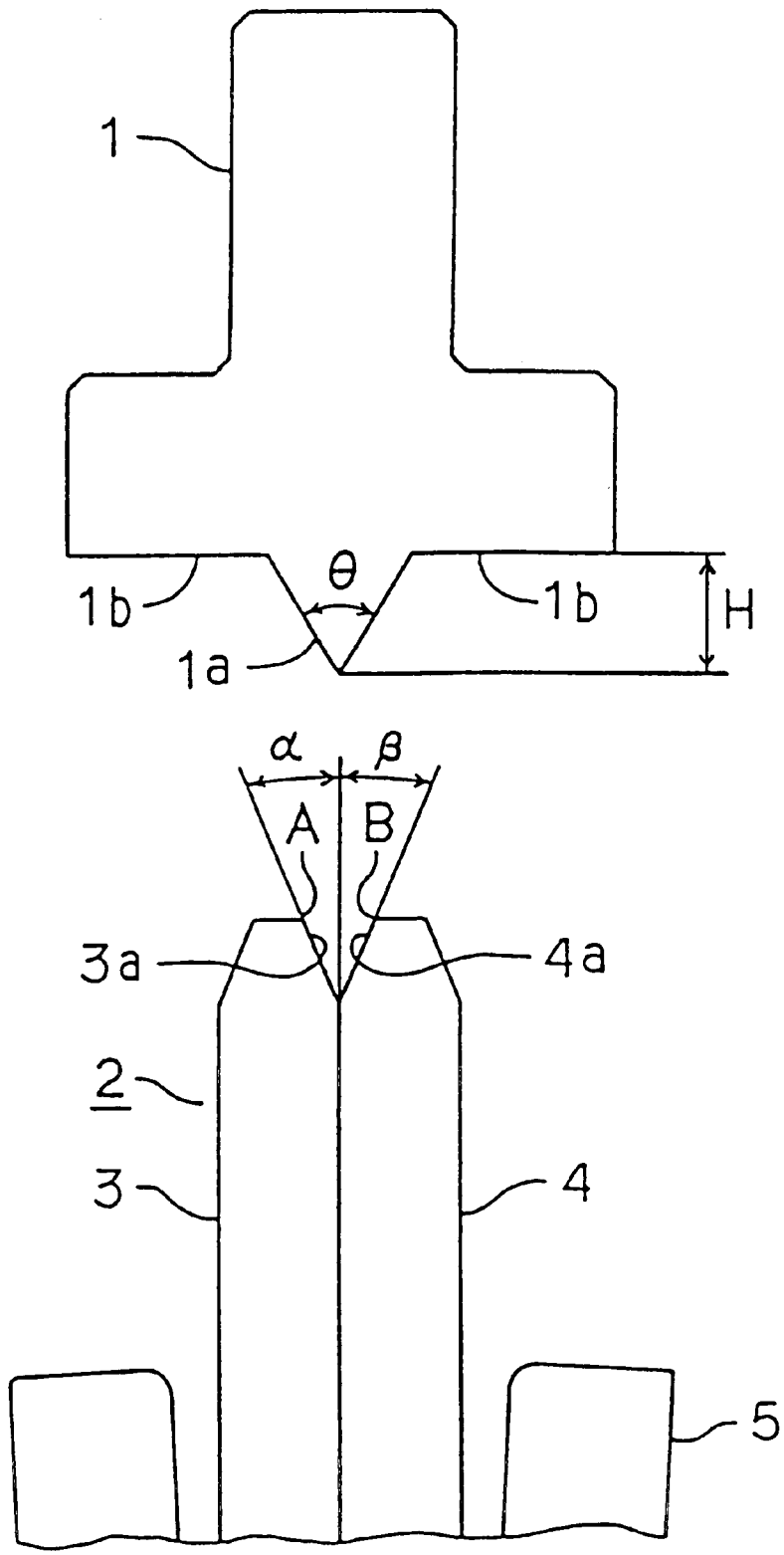
FIG. 1 is a schematic view showing a peeling jig brought to a bonded wafer.

The peeling jig 1, as shown in FIG. 1, is fabricated by using a material which has good accuracy of finishing and does not injure the wafer surface, such as vinyl chloride resins and PEEK materials (polyether ether ketone). The wedge portion 1a provided at the bottom of the peeling jig is formed with an apex angle $\theta$ to be inserted into the bonding surface from the peripheries of the bonded wafers, and is provided with flat portions 1b, 1b at its both sides. The height H of the wedge portion 1a is at least 2 mm which is sufficient for the separation of bonded wafers. The flat portion 1b functions as a stopper to control the inserted depth of wedge portion 1a less than H. Moreover, the thickness of the peeling jig 1 is about 10 mm.

Bonded wafer 2 is formed by bonding supporting substrate (wafer)3 and active wafer 4, and providing chamfered portions 3a, 4a at the peripheries of the above-mentioned two wafers. A V-shaped groove is formed by the chamfered portion 3a, 4a at the periphery of the bonding portion of the bonded wafer 2. The apex angle $\theta$ of wedge portion 1a of the peeling jig corresponds to the angle of the V-shaped groove of bonded wafer 2 and is determined as follows. That is, if the angle of the chamfered portion 3a is α and the angle of the chamfered portion 4a is β, then the apex angle of the wedge portion 1a is θ and θ>α+β. In this embodiment, 30°<α+β<60°.

Figure 2:
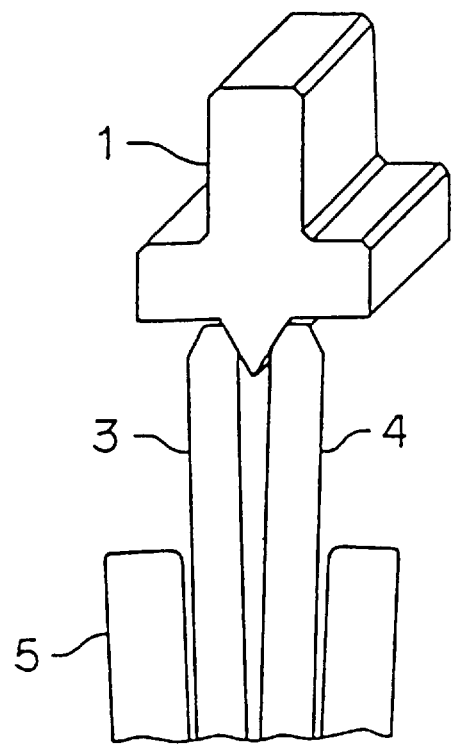
FIG. 2 is a schematic view showing the bonding surface of the wafers in a separated state by the peeling jig.
Figure 3:
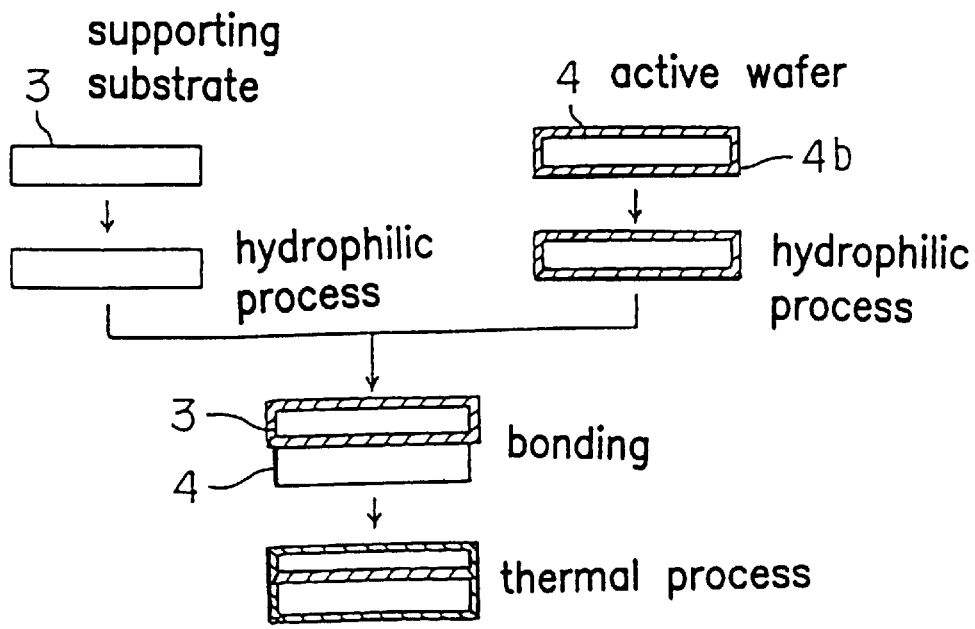
FIG. 3 is a schematic view showing the process for fabricating a bonded SOI wafer.

When bonded wafer 2 is to be peeled, the bonded wafer 2 is placed in a supporting tool 5 which is formed by fixing two plates in a V-shaped manner, and then the wedge portion 1a of the peeling jig 1 is inserted into the chamfered portion at the periphery of the bonded wafer 2. The right and left inclined surfaces that form the wedge portion 1a are respectively in contact with the periphery A of the chamfered portion 3a provided at the supporting substrate 3, and the periphery B of the chamfered portion 4a provided at the active wafer 4, and the V-shaped groove is flared by inserting into the wedge portion 1a. Then, as shown in FIG. 2, until the flat portions 1b, 1b become contacting with the periphery of the bonded wafer 2, bonded wafer 2 is separated from the bonding surface.

When using the peeling jig, the surface of the separated wafer is not injured and no particles adhere thereto, so that by applying only an ordinary hydrophilic process (washing with ammonia or hydrogen peroxide solution) which is conducted prior to bonding, it is possible to rebond the separated wafers.

Next, experimental results of peeling the bonded wafers by using the peeling jig of the invention are described. Six peeling jigs were designed in combination with the apex angle θ of wedge portion which is 30° or 60° and the height H of wedge portion is 2 mm, 3 mm, or 5 mm. The dimensions of their wedge portions are indicated in Table 1 below.

TABLE 1

| Jigs | θ (°) | H (mm) |
|------|-------|--------|
| 1 | 30 | 2 |
| 2 | 60 | 2 |
| 3 | 30 | 3 |
| 4 | 60 | 3 |
| 5 | 30 | 5 |
| 6 | 60 | 5 |

Peeling operations of bonded wafers using the above six jigs were conducted, and with respect to the separated active wafers and supporting substrates, a microscopic examination was made to determine whether there were scars formed on or particals adhering to the contacting portion with the peeling jigs. The results are indicated in Table 2 below.

TABLE 2

| Exper. No. | wafers | Jig 1 | Jig 2 | Jig 3 | Jig 4 | Jig 5 | Jig 6 |
|------|--------|-------|-------|-------|-------|-------|-------|
| 1 | active wafers | X | ○ | X | ○ | X | ○ |
|   | supporting substrate | X | ○ | ○ | ○ | X | ○ |
| 2 | active wafer | X | ○ | X | ○ | X | ○ |
|   | supporting substrate | X | ○ | Δ | ○ | X | ○ |

Note: ○: no particles and scars
X: particles found
Δ: few particles

It is seen from Table 2 that when using jigs 1,3 and 5 (θ=30°), no matter how high the H is, particles were adhered to the active wafers or both the active wafers and the supporting substrates. On the contrary, when using jigs 2, 4 and 6 (θ=60°), no adherence of particles and no scars were found. The reason that particles were adhered thereto when using jigs 1,3 and 5, is that the chamfered angle of the bonded wafer, i.e. the chamfered angle as shown in FIG. 1, α+β, is between 30° and 60°, the θ is 30°, and therefore the relationship between the apex angle θ of the wedge portion 1a and the chamfered angle α+β is θ<α+β.

Moreover, separated active wafers and supporting substrates by using jig 4 (θ=60°, H=3 mm) and jig 6 (θ=60°, H=5 mm) were subjected to normal hydrophilic process and their rebonding was tested. Then, a microscopic examination was conducted to determine whether there were voids formed at the contacting portion with the peeling jigs when peeling, and no voids were found. Accordingly, when using a peeling jig having an apex angle θ of the wedge portion greater than the chamfered angle α+β of the bonding surface, bonded wafers can be separated and the separated wafers are reusable.

In this embodiment, peeling jigs for bonded SOI wafers are described. However, the peeling jigs of the invention are not limited to this use only. For example, the jigs of the invention can also be used in peeling of a bonded wafer which is formed by directly bonding two silicon wafers, i.e. bonded wafers without an insulating film as intermediate layer. The bonded wafer can be used as a substitute for an epitaxal wafer.

As described above, in accordance with the invention, as the apex angle of the wedge portion of the peeling jig is larger than the sum of the chamfered angles formed at the periphery of the bonded wafer such as bonded SOI wafer, and the chamfered portion of the bonded wafer is flared by the wedge portion, the bonded wafer is separated without the formation of scars or the adherence of particles. Accordingly, the separated wafers can be rebonded by applying a normal hydrophilic process, and the manufacturing cost of the bonded wafers such as bonded SOI wafer can be reduced.

What is claimed is:

1. A peeling jig adapted for separating a bonded wafer into two wafers after the two wafers have been bonded together in a bonding process, in order to prepare the two wafers to be bonded again, the two wafers respectively having a mirror-polished surfaced and a flat peripheral edge arranged at a chamfered angle, the peeling jig comprising:

a wedge portion adapted for inserting into a bonding surface of the bonded wafer between the flat peripheral edges of the two wafers, and a flat portion provided at both sides of a base of the wedge portion, wherein the wedge portion has apex angle larger than the sum of the chamfered angles of the two wafers and the flat portion is formed so that insertion depth is controlled and the bonded wafer is separated without damaging a surface of the two wafers.

2. A peeling jig adapted for separating a bonded wafer into two wafers after the two wafers have been bonded together in a bonding process, the two wafers respectively having a peripheral edge with a chamfered angle, the peeling jig being made of a material that does not damage the wafer surface and comprising:

a wedge portion adapted for inserting into a bonding surface of the bonded wafer between the peripheral edges of the two wafers; the wedge having a structure sufficient for separating the two wafers by flaring the two wafers outward relative to each other without damaging a surface of the two wafers, and including an apex angle larger than the sum of the chamfered angles of the two wafers; and a flat portion provided at both sides of a base of the wedge portion for controlling insertion depth of the wedge portion.

3. The peeling jig according to claim 2, wherein the wedge has a structure so that after separation of the two wafers no particles adhere to the surfaces of the two wafers.

4. A peeling jig for separating a bonded wafer into two wafers after the two wafers have been bonded together in a bonding process, the two wafers respectively having a peripheral edge with a chamfered angle, the peeling jig being made of a material selected from the group consisting of vinyl chloride resins and PEEK materials and comprising:

a wedge portion adapted for inserting into a bonding surface of the bonded wafer between the peripheral edges of the two wafers; the wedge having a structure sufficient for separating the two wafers by flaring the two wafers outward relative to each other without damaging a surface of the two wafers, and including an apex angle larger than the sum of the chamfered angles of the two wafers; and a flat portion provided at both sides of a base of the wedge portion for controlling insertion depth of the wedge portion.

5. A peeling jig adapted for separating a bonded wafer into two wafers after the two wafers have been bonded together in a bonding process, the two wafers having a bonded surface and a respective peripheral edge with a flat chamfered portion adjacent the bonded surface and arranged at an angle relative to the bonded surface, the peeling jig comprising:

a wedge portion adapted for inserting toward the bonding surface of the bonded wafer between the peripheral edges of the two wafers, the wedge having a structure including an apex angle of sufficient size for separating the two wafers by contacting with the flat chamfered portions of the two wafers and without contacting the bonded surface.

6. The peeling jig according to claim 5, wherein the apex angle is larger than the sum of an angle formed by the chamfered edges of the two wafers, and a flat portion is provided at both sides of a base of the wedge portion for controlling insertion depth of the wedge portion.

* * * * *